Sept. 28, 1937.　　　W. M. WILSON ET AL　　　2,094,513
PLANT FERTILIZING CONTAINER
Filed Oct. 11, 1935

Wilbert Moody Wilson
Lewis H. Urling
INVENTORS
BY Victor J. Evans & Co.
ATTORNEY Patented Sept. 28, 1937

2,094,513

UNITED STATES PATENT OFFICE 2,094,513

PLANT FERTILIZING CONTAINER

Wilbert Moody Wilson and Lewis H. Urling, Beaver, Pa.

Application October 11, 1935, Serial No. 44,592

1 Claim. (Cl. 71—64)

This invention relates to containers, and its general object is to provide a container in the form of a pot for plants and the like, that is formed entirely from material for supplying nourishing food and moisture, to promote and maintain healthy growth of the plants with minimum attention.

A further object of the invention is to provide a moisture holding fertilizing container for plants, that is capable of retaining its shape for a prolonged period of time when used as a container or pot, but may be buried in the soil with the plant therein, when the latter has obtained sufficient growth for transplanting and in that event the container will continue to supply growth promoting material to the plant, as well as be diffused within the soil, to enrich the latter, consequently the plant will obtain a full and luxurious growth in minimum time and be maintained accordingly for a prolonged period.

A still further object of the invention is to provide a container that is made entirely of peat moss or humus, animal manure and other fertilizing materials, such as potassium chloride, sodium nitrate, a suitable phosphate or the like, as well as moisture and a binder if necessary to hold the mass into container or pot formation.

Another object of the invention is to provide a method of producing a diffusible moisture holding fertilizing container for plants, that consists of compacting the material thereof under pressure, in suitable molds, and heating the pressed product to dispel excess moisture therefrom.

A further object of the invention is to provide a container of the character set forth, that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claim.

In describing our invention in detail, reference will be had to the accompanying drawing wherein like characters denote like or corresponding parts throughout the several views, and in which.

Figure 1:
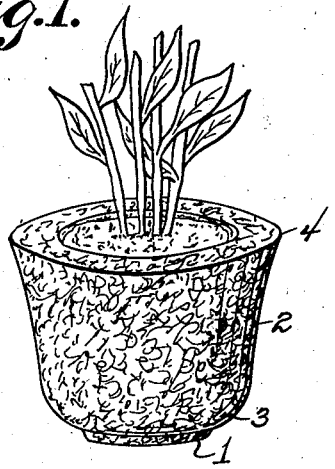
Figure 1 is a perspective view illustrating one form of our container in use.
Figure 2:
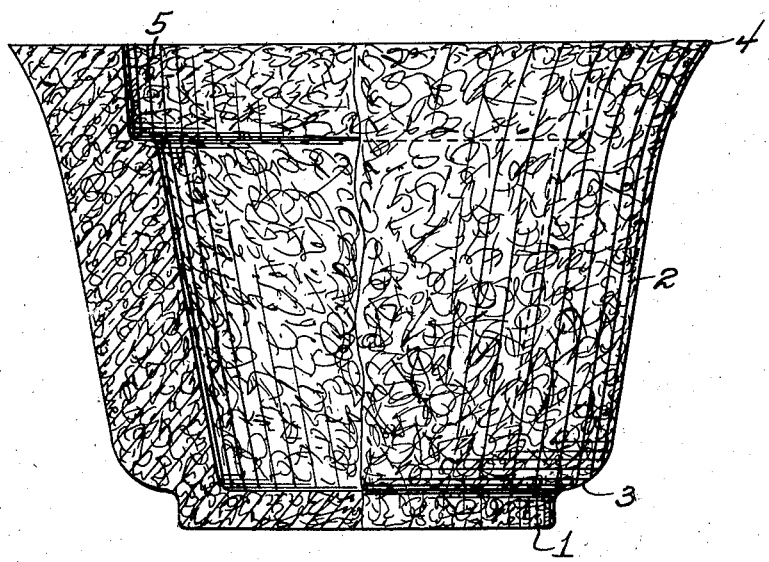
Figure 2 is a view thereof partly in section and in elevation.

Referring to the drawing in detail, it will be noted that we have illustrated one form of our invention, but we want it understood that the container can be made in any size and shape and from any material suitable for the purpose, without departing from the spirit of the invention.

The container as shown is of bowl like configuration and includes a base 1 which has formed therewith and rising therefrom the annular wall 2, the outer surface of which extends outwardly from the base 1 in curved formation as at 3 and is thence directed upwardly at an outward inclination and merges into an outwardly flared upper portion 4. The wall 2 provides the body for the container, and it will be noted that the inner surface thereof is tapered for the major portion of its height and from the base 1 to a shouldered portion 5 at the upper end of the body.

While the shape and size of our container is of no great importance, the ingredients from which it is made are of extreme importance, as it is formed entirely and solely from plant growth promoting material which not only has the qualities of providing food for the plant but also the capacity of holding moisture, which together with the food naturally stimulates the plant to bring about healthy and maximum growth thereof in minimum time and to maintain the growth accordingly.

Any suitable ingredients in any quantity may be used in making up the mass of our container, but we have found that a mixture of peat moss or humus, animal manure, potassium chloride, sodium nitrate, calcium tri-phosphate or other suitable phosphate, water and a suitable binder if necessary, is very satisfactory for the purpose intended.

The quantities of the essential ingredients are preferably as follows:

Four parts peat moss or humus
Six parts animal manure
One part potassium chloride
One part sodium nitrate
Two parts calcium tri-phosphate The method of producing the container from the ingredients consists of compacting the mass under pressure in suitable molds, and heating the pressed mass to dispel excess moisture therefrom. When the mass is dry, it is removed from the molds and is then in condition for use to receive a quantity of soil for supporting a plant, as clearly shown in Figure 1 of the drawing.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:

A plant growth promoting container of bowl like configuration formed from moisture holding fertilizing material, consisting essentially of approximately four parts humus, six parts animal manure, one part potassium chloride, one part sodium nitrate, and two parts calcium tri-phosphate, and said container comprising a base, a thick hollow body rising from the base and having an outer surface extending outwardly from the base in curved formation, thence tapered upwardly at an outward inclination and terminating in an outwardly flared upper end, and the inner surface being tapered outwardly for the major portion of its height from the base and having a shouldered portion at the upper end thereof.

LEWIS H. URLING.
WILBERT MOODY WILSON.